United States Patent Office 3,518,499
Patented June 30, 1970

3,518,499
ELECTROLYTE FOR ELECTROLYTIC CAPACITORS
Harold D. Shepherd, Fort Wayne, and Daniel J. Anderson, Indianapolis, Ind., assignors to P. R. Mallory & Co. Inc., Indianapolis, Ind., a corporation of Delaware
Continuation-in-part of application Ser. No. 338,206, Jan. 16, 1964. This application Jan. 29, 1968, Ser. No. 701,416
Int. Cl. H01g 9/05
U.S. Cl. 317—230         11 Claims

ABSTRACT OF THE DISCLOSURE

An electrolytic capacitor having a pair of electrodes and an electrolyte. The electrodes include at least one electrode composed essentially of a film-forming metal. The electrolyte consists essentially of about 1–46% by weight of an amine salt of maleic acid, the remainder essentially a glycol ether.

---

Figure 1:
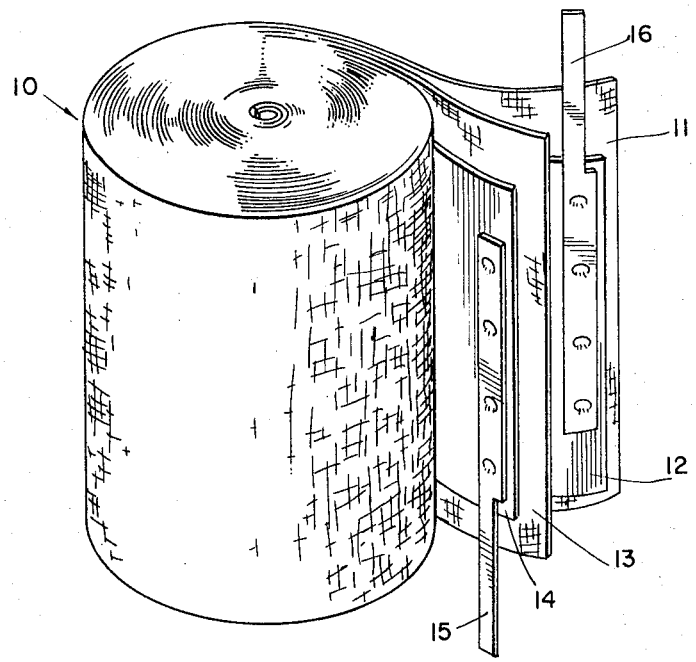

This is a continuation-in-part of application Ser. No. 338,206 filed Jan. 16, 1964, now abandoned.

This invention relates to electrolytes for electrolytic devices and has specific pertinence to an improved low temperature electrolyte designed for use in capacitors.

It has long been known that film-forming metals such as aluminum and tantalum can be anodized to provide an extremely thin oxide film thereon having excellent dielectric properties. It is furthermore well known that metal foils possessing such dielectric oxide films can be employed in the manufacture of capacitors.

Those skilled in the art are aware that virtually every dielectric oxide film formed by conventional electroforming techniques is possessed of numerous imperfections and irregularities which increase the leakage current and reduce the dielectric strength in capacitors. The addition of an electrolyte serves not only as a conductive solution for transporting electrical charges between the anode and the cathode, but also provides oxygen for repair of the imperfect anodic dielectric film.

Among the many desirable characteristics of a capacitor electrolyte, perhaps the most difficult to achieve, is stability of resistance throughout a broad range of operating temperatures. This problem is most acute in the low temperature range, for example, between —40° C. and —55° C. A widely used electrolyte solution of ammonium borate and ethylene glycol undergoes radical changes in electrical characteristics at such reduced temperature levels. The specific resistance is found to increase at a rapid rate, with the result that capacitor performance is seriously impaired.

Where ethylene glycol is employed as the solvent in an electrolyte, definite limitations are found to exist. For example, unless water is added to the electrolyte, the specific resistance at room temperature will be relatively high, and the capacitance of capacitors made with such an electrolyte will fall off abruptly at temperatures of —30° C. and below. If water is added to the electrolyte, however, the stability of the capacitor on life test is found to be adversely affected, and failures due to internal pressure are more likely to occur.

It is highly desirable, thereore, to provide an electrolyte which will exhibit acceptable resistance characteristics at temperatures as low as —55° C., yet will not require the addition of water thereto. Accordingly, in the present invention there is disclosed a low temperature electrolyte series which attains the aforementioned standards and which provides improved performance characteristics in electrolytic capacitor applications. Instead of using ethylene glycol as the solvent, the electrolytes of the present invention employ glycol ethers of the monohydroxy type. Typical solvents employed herein are monoalkyl ethers of ethylene glycol, diethylene glycol, and their homologs.

The solute incorporated in the aforementioned glycol ethers is an amine salt of maleic acid.

A comparison of the respective freezing points of glycols and glycol ethers serves to illustrate why the low temperature characteristics of capacitors employing the latter type solvent are superior. For example, the freezing point of ethylene glycol is —12.7° C., whereas the freezing point of a typical glycol ether, viz., ethylene glycol monomethyl ether, is —85°C. Selection of a suitable solvent, therefore, is of paramount importance in arriving at a satisfactory low temperature electrolyte composition. The superiority of the instant electrolyte will become apparent as the present description progresses.

It is an object of the prseent invention, therefore, to provide a capacitor electrolyte which possesses a comparatively high degree of resistance stability throughout a temperature range of approximately —55° C. to +85° C.

It is a further object of the present invention to provide an electrolyte which exhibits a relatively low specific resistance at temperatures as low as —55° C.

Another object of the present invention is to provide an electrolyte which will produce improved electrical characteristics in a capacitor operating in the approximate temperature range of —55° C. to +85° C.

Yet another object of the present invention is to provide an improved non-aqueous electrolyte which, when incorporated into a capacitor of the wound foil type, will afford excellent life characteristics to said capacitor.

Still another object of the present invention is to utilize a low freezing point solvent comprising a glycol ether of the monohydroxy type.

Still another object of the present invention is to provide an improved non-aqueous electrolyte comprising an amine salt of maleic acid, dissolved in a glycol ether solvent of the monohydroxy type.

Yet another object of the present invention is to provide an improved non-aqueous electrolyte which is readily adaptable for use in capacitors of the wound foil type.

Yet another object of the present invention is to provide an improved non-aqueous electrolyte which can be easily prepared and handled.

Still another object o the present invention is to provide an improved non-aqueous electrolyte which comprises inexpensive and readily available constituents.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing wherein like reference characters describe elements of similar function therein, and wherein the scope of the invention is determined rather from the dependent claims.

Figure 2:
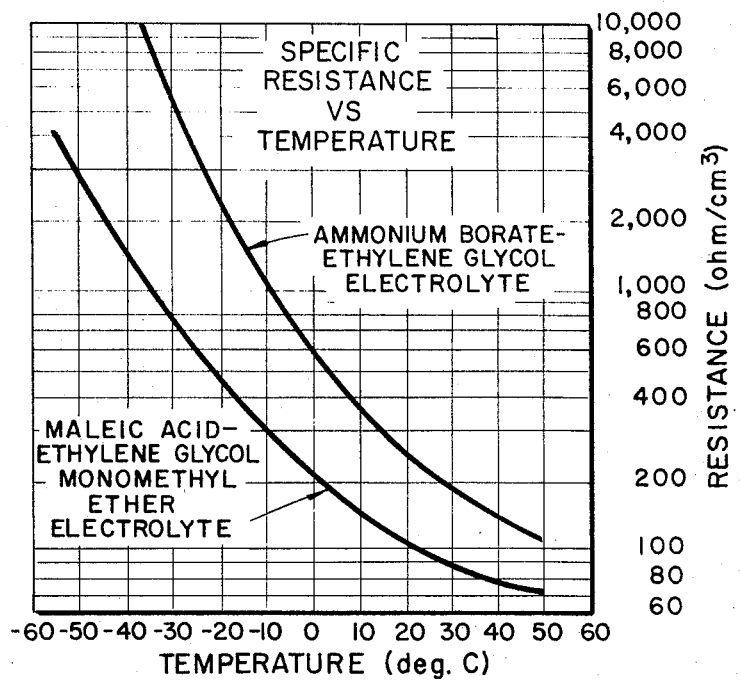

In the drawings:

FIG. 1. is a perspective view of a partially unwound electrolytic capacitor body to which the present invention is applicable. FIG. 2 presents a curve of specific resistance vs. temperature for two electrolytes, one of which is disclosed by the present invention.

Referring now to the drawing, FIG. 1 presents an electrolytic capacitor of the wound foil type denoted generally by reference numeral 10. Capacitor 10 comprises anode 12 of film-forming metal (e.g., aluminum, tantalum, niobium, zirconium) having on its surface an oxide film which functions as the active dielectric for the capacitor. Said dielectric oxide film is formed on anode 12 in accordance with accepted anodization techniques. Cathode 14 may be composed of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10. Tabs 15 and 16 may extend from the same or opposite ends of the capacitor.

FIG. 2 presents a graphic comparison of the specific resistance characteristics of two electrolytes at varying temperature. One curve illustrates the performance of a solution of ammonium borate and ethylene glycol, a well-known capacitor electrolyte. The other curve illustrates the performance of a solution of diethylamine maleate dissolved in ethylene glycol monomethyl ether. The latter solution comprises an improved low temperature electrolyte of the present invention. From these curves, therefore, it is readily apparent that the electrolyte of the present invention affords substantially greater resistance stability throughout the temperature range. The diethylamine maleate-ethylene glycol monomethyl ether electrolyte is especially advantageous at extreme temperature such as —40° C., where it is observed that ammonium borate exhibits a radical increase in specific resistance. A capacitor embodying the electrolyte of the present invention will have substantially greater capacitance and lower dissipation factor below —40° C., than one containing the ammonium borate electrolyte.

As hereinbefore mentioned, the extremely low freezing point of mono-alkyl ethers of ethylene glycol and mono-alkyl ethers of diethylene glycol are responsible for the excellent low temperature electrical characteristics of capacitor employing electrolytes compounded with a solvent from the abovementioned group of solvents. The following table serves to illustrate the marked difference in freezing points of several of the mono-alkyl ethers of ethylene glycol and of the mono alkyl ethers of diethylene glycol solvents as compared to glycol solvents.

FREEZING POINT COMPARISON

| Compound: | Freezing point (° C.) |
|---|---|
| Ethylene glycol | —12.7 |
| Diethylene glycol | —7.8 |
| Ethylene glycol monomethyl ether | —85 |
| Diethylene glycol monomethyl ether | —62 |
| Ethylene glycol monobutyl ether | —65 |
| Diethylene glycol monobutyl ether | —68 |

Broadly stated, the electrolyte of the present invention consists of an amine salt maleic acid dissolved in ether, a mono-alkyl ether of ethylene glycol or a mono-alkyl ether of diethylene glycol. Examples of a suitable mono-alkyl ether of ethylene glycol would include ethylene glycol monoethyl ether, ethylene glyco monomethyl ether, ethylene glycol monobutyl ether, ethylene glycol monopropyl ether, ethylene glycol monoamyl ether and ethylene glycol monohexyl ether. Examples of a suitable mono-alkyl ether of diethylene glycol would include diethylene glycol monoethyl ether, diethylene glycol monomethyl ether, diethylene glycol monobutyl ether, diethylene glycol monopropyl ether, diethylene glycol monoamyl ether and diethylene glycol monohexyl ether. Of the two classes of solvents, the mono-alkyl ethers of ethylene glycol is preferred. Of the several solvents within the mono-alkyl ether class, ethylene glycol monomethyl ether is most preferred.

The term "non-aqueous," as used herein, refers to the existence of no more than a trace amount of water. Although it has been found that the weight percentages of the electrolyte constituents employed herein may vary considerably for capacitor applications, a typical formulation having excellent properties would be as follows:

100 grams ethylene glycol monomethyl ether
30 grams maleic acid
25 milliliters ethylamine The solute salt in the aforementioned typical electrolyte is, of course, diethylamine maleate, and the solvent is ethylene glycol monomethyl ether. Other suitable solute salts include those containing low molecular weight amines, i.e., those having a molecular weight below about 200 and more particularly the alkyl amines and alkanol amines containing not more than two amine groups. Specific examples of suitable amine salts include ethylene diamine maleate, propylene diamine maleate, ethylamine maleate, diethylamine maleate, triethylamine maleate, methylamine maleate, dibutylamine maleate, tributylamine maleate, monoethanolamine maleate, tributylamine maleate, monoethanalamine maleate, diethanolamine maleate, propylamine maleate and disopropylamine maleate.

It has been found that the solute salt should not be less than 1% by weight and should not exceed 46% by weight of the total weight of the electrolyte composition. The preferred weight percent of the constituents of the electrolyte is about 25.4% of solute salt, the remainder essentially the solvent.

Capacitors embodying the electrolyte of the present invention have been subjected to life tests and low temperature performance tests. The following examples will serve to illustrate the superiority of this electrolyte.

Example 1

Four capacitors of the anodized aluminum foil type are impregnated with the electrolyte of the present invention and the foils were convolutely wound in the conventional manner. The electrolyte formulation consists of 100 grams diethylene glycol monomethyl ether, 20 grams maleic acid, and 20 milliliters diethylamine. The specific resistance of this electrolyte at 30° C. is measured as 175 ohms per cubic centimeter. Each capacitor is subjected to a 500 hour life test at 85° and 5 volts, the nominal capacitance rating being 100 microfarads at 5 volts. The following table shows comparative data before and after the test, averaging the performance of the four capacitor units:

| Test Hours | Temperature, ° C. | Capacitance mfd., | Dissipation Factor, Percent | Leakage Current, Micro-Amps after 3 min. at 30 volts. |
|---|---|---|---|---|
| 0 | 85 | 111.7 | 5.9 | 0.36 |
| 500 | 85 | 108.7 | 11.2 | 0.16 |

Example 2

Four more capacitors of the type described in Example 1 are impregnated with the electrolyte having the following formulation: 100 grams ethylene glycol monomethyl ether, 20 grams maleic acid, and 20 milliliters diethylamine. Twenty milliliters of diethylamine corresponds to about 14.1 grams of diethylamine. The specific resistance of this electrolyte at 30° C. is measured as 92 ohms per cubic centimeter. Each capacitor is subjected to a 500 hour life test at the same conditions of Example 1. The following table shows comparative data before and after the test, averaging the performance of the four capacitor units:

| Test Hours | Temperature, ° C. | Capacitance, mfd. | Dissipation Factor, Percent | Leakage Current, Micro-Amps after 3 min. at 5 volts. |
|---|---|---|---|---|
| 0 | 85 | 113.7 | 4.7 | 0.37 |
| 500 | 85 | 115.2 | 6.7 | 0.12 |

Example 3

Five additional capacitors of the wound foil type are impregnated with yet another electrolyte taught by the present invention. The electrolyte formulation comprises: 100 grams ethylene glycol monomethyl ether, 30 grams maleic acid, and 25 milliliters diethylamine. The specific resistance of this electrolyte at 30° C. is measured as 92 ohms per cubic centimeter. Each capacitor was subjected to a 1000 hour life test at 85° C. and 30 volts, the nominal capacitance rating being 33 microfarads at 30 volts. The following table shows comparative data before and after the test, averaging the performance of the five capacitor units:

| Test Hours | Temperature, °C. | Capacitance, mfd. | Dissipation Factor, Percent | Leakage Current, Micro-Amps after 3 min. at 30 volts. |
|---|---|---|---|---|
| 0 | 85 | 50.7 | 2.8 | 0.28 |
| 1,000 | 85 | 51.9 | 3.1 | 0.072 |

Example 4

Five more capacitors are subjected to a 1000 hour life test, using the electrolyte formulation of Example 2, viz, 100 grams ethylene glycol monomethyl ether, 20 grams maleic acid, and 20 milliliters diethylamine. The following table presents comparative data before and after the test:

| Test Hours | Temperature, °C. | Capacitance, mfd. | Dissipation Factor, Percent | Leakage Current, Micro-Amps after 3 min. at 5 volts. |
|---|---|---|---|---|
| 0 | 85 | 50.6 | 2.9 | 0.32 |
| 1,000 | 85 | 50.2 | 3.3 | 0.072 |

Example 5

Eight capacitors employing glycol ether electrolytes are subjected to a low temperature performance test. Four of these units utilized the electrolyte of Example 2, and four employed the electrolyte of Example 3. Each of the capacitors has a rating of 33 microfarads at 30 volts. Since the low temperature performance of all eight units was equivalent, the following table presents average values of the electrical characteristics at room temperature and at −40° C.:

| Temperature, °C. | Capacitance, mfd. | Dissipation Factor, Percent |
|---|---|---|
| Room | 51.3 | 2.7 |
| −40 | 47.2 | 7.2 |

Example 6

Four additional capacitors employing the electrolyte of the present invention were subjected to a low temperature performance test. These units utilized the electrolyte of Example 4. The rating of the units was 100 microfarads at 25 volts.

| Temperature, °C. | Capacitance, mfd. | Dissipation Factor, Percent |
|---|---|---|
| Room | 138.80 | 2.99 |
| −40 | 130.50 | 74.30 |

Of the numerous examples presented above, particular attention is drawn to Example 6 wherein the superior low temperature properties of the present electrolyte are evident.

The electrolyte of the present invention, as hereinbefore described in several of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:

1. An electrolytic capacitor comprising a pair of electrodes at least one of which is composed essentially of a film-forming metal and has a dielectric oxide film thereon, and an electrolyte consisting essentially of about 1–46% by weight of an amine salt of maleic acid, the remainder essentially a glycol ether.

2. An electrolytic capacitor as claimed in claim 1, wherein said amine salt of maleic acid is selected from the group of low molecular weight alkylamines and alkanolamines containing not more than two amine groups.

3. An electrolytic capacitor as claimed in claim 2, wherein said glycol ether is selected from the group consisting of the monoalkyl ethers of ethylene glycol.

4. An electrolytic capacitor as claimed in claim 3, wherein said mono-alkyl ether of ethylene glycol is selected from the group consisting of ethylene glycol monoethyl, ethylene glycol monomethyl ether, ethylene glycol monobutyl ether, ethylene glycol monopropyl ether, ethylene glycol monoamyl ether and ethylene glycol monohexyl ether.

5. An electrolytic capacitor as claimed in claim 2, wherein said glycol ether is selected from the group consisting of the mono-alkyl ethers of diethylene glycol.

6. An electrolytic capacitor as claimed in claim 5, wherein said mono-alkyl ethers of diethylene glycol is selected from the group consisting of diethylene glycol monoethyl ether, diethylene glycol monomethyl ether, diethylene glycol monobutyl ether, diethylene glycol monopropyl ether, diethylene glycol monoamyl ether and diethylene glycol monohexyl ether.

7. An electrolytic capacitor as claimed in claim 1, wherein said amine salt of maleic acid is diethylamine maleate and said glycol ether is ethylene glycol monomethyl ether.

8. An electrolytic capacitor as claimed in claim 7, wherein said film-forming metal is selected from the group consisting of aluminum, tantalum, noibium and zirconium.

9. An electrolytic capacitor as claimed in claim 8, wherein the anode electrode consists essentially of a metal selected from said film-forming metals and said cathode consists essentially of a metal selected from the group consisting of aluminum, tantalum, niobium, zirconium and silver.

10. An electrolytic capacitor as claimed in claim 9, wherein said anode electrode and said cathode electrodes are convolutely wound foil electrodes consisting essentially of aluminum, tab means connected to said foil electrodes, and spacer means positioned between and separating said anode electrode and said cathode electrode, said spacer means impregnate with said electrolyte.

11. An electrolytic capacitor as claimed in claim 1, wherein said electrolyte consists essentially of about 25% by weight of an amine salt of maleic acid, the remainder essentially a glycol ether.

References Cited

UNITED STATES PATENTS

| 1,959,130 | 5/1934 | Hambuecheu et al. | 317—230 |
| 2,149,086 | 2/1939 | Craine | 317—230 |
| 2,945,164 | 7/1960 | Taylor | 317—230 |
| 2,965,816 | 12/1960 | Ross | 317—230 |
| 3,138,746 | 6/1964 | Burger | 317—230 |

JAMES D. KALLAM, Primary Examiner

U.S. Cl. X.R.

252—62.2